United States Patent
Caruana

(10) Patent No.: US 12,253,175 B2
(45) Date of Patent: Mar. 18, 2025

(54) METAL BELLOWS FOR DOWNHOLE USE

(71) Applicant: TCO AS, Indre Arna (NO)

(72) Inventor: Adrian Caruana, Indre Arne (NO)

(73) Assignee: TCO AS, Indre Arna (NO)

(*) Notice: Subject to any disclaimer, the term of this patent is extended or adjusted under 35 U.S.C. 154(b) by 575 days.

(21) Appl. No.: 17/668,353

(22) Filed: Feb. 9, 2022

(65) Prior Publication Data
US 2022/0268360 A1 Aug. 25, 2022

(30) Foreign Application Priority Data

Feb. 11, 2021 (NO) .................................. 20210177

(51) Int. Cl.
*F16J 3/04* (2006.01)
*B21D 15/10* (2006.01)
(Continued)

(52) U.S. Cl.
CPC .............. *F16J 3/047* (2013.01); *F16J 15/52* (2013.01); *B21D 15/10* (2013.01); *B23K 31/027* (2013.01); *B23K 2101/08* (2018.08)

(58) Field of Classification Search
CPC ...... F16J 3/04; F16J 3/047; F16J 3/048; F16J 15/36; F16J 15/363; F16J 15/52; B21D 15/10
See application file for complete search history.

(56) References Cited

U.S. PATENT DOCUMENTS

| | | | | |
|---|---|---|---|---|
| 2,333,401 A | * | 11/1943 | Woods | F16J 3/048 92/41 |
| 2,685,305 A | | 8/1954 | Woods | |

(Continued)

FOREIGN PATENT DOCUMENTS

| | | | | |
|---|---|---|---|---|
| CA | 2847520 A1 | * | 9/2015 | ............. B21D 15/06 |
| CH | 369632 A | * | 5/1963 | |

(Continued)

OTHER PUBLICATIONS

Intellectual Property Office, Combined Search and Examination Report, Application No. GB2201680.2, May 20, 2022.

(Continued)

*Primary Examiner* — Jonathan P Masinick
(74) *Attorney, Agent, or Firm* — Flener IP & Business Law; Zareefa B. Flener

(57) ABSTRACT

A metal bellows for downhole use includes: a bellows capsule with a first end and a second end; an inner diameter side and an outer diameter side arranged between the first end and the second end; where the bellows capsule comprises a first bellows convolution and second bellows convolution and optionally additional bellows convolutions; and each bellows convolution comprises: a root on the inner diameter side of the bellows capsule; a first sidewall extending from the root toward the outer diameter side of the bellows capsule with a first connection point at the distal end; a second sidewall extending from the root toward the outer diameter side of the bellows capsule with a second connection point at the distal end and wherein the second sidewall is on the opposite side of the root as the first sidewall; wherein: the bellows convolutions are formed as a single piece; and the second sidewall connection point of the first bellows convolution is permanently affixed to the first sidewall connection point of the second bellows convolution.

17 Claims, 13 Drawing Sheets

(51) Int. Cl.
   *B23K 31/02* (2006.01)
   *B23K 101/08* (2006.01)
   *F16J 15/52* (2006.01)

(56) References Cited

U.S. PATENT DOCUMENTS

| | | | | |
|---|---|---|---|---|
| 2,811,173 | A * | 10/1957 | Benson | F16J 3/047 |
| | | | | 29/454 |
| 2,925,829 | A * | 2/1960 | Thompson, Sr. | F15B 15/10 |
| | | | | 29/454 |
| 3,326,091 | A * | 6/1967 | Allen | F16J 3/047 |
| | | | | 29/454 |
| 3,776,560 | A * | 12/1973 | Wentworth, Jr. | B60S 1/38 |
| | | | | 277/393 |
| 5,011,166 | A | 4/1991 | Watts | |
| 5,261,317 | A * | 11/1993 | Fraser, Jr. | F16J 3/047 |
| | | | | 92/45 |
| 5,261,319 | A * | 11/1993 | Laville | F16J 3/047 |
| | | | | 92/103 M |
| 5,901,965 | A * | 5/1999 | Ringer | F16J 15/363 |
| | | | | 277/389 |
| 6,216,743 | B1 | 4/2001 | Kosaki | F01N 13/1816 |
| | | | | 138/109 |
| 6,311,983 | B1 * | 11/2001 | Burcham | F16J 15/44 |
| | | | | 415/113 |
| 8,690,195 | B2 * | 4/2014 | Chahine | F16L 27/11 |
| | | | | 285/227 |
| 9,423,033 | B2 * | 8/2016 | Matsumura | F16J 15/52 |
| 9,797,516 | B2 * | 10/2017 | Wellner | F16J 15/36 |
| 9,958,092 | B2 * | 5/2018 | Tatzreiter | F16J 3/047 |
| 9,960,070 | B2 * | 5/2018 | Huang | H01L 21/68785 |
| 10,190,686 | B2 * | 1/2019 | Nagamachi | F16J 3/041 |
| 10,190,692 | B2 * | 1/2019 | Davey | F16L 51/035 |
| 10,323,746 | B2 * | 6/2019 | Endo | F15B 1/10 |
| 10,378,649 | B2 * | 8/2019 | Sato | F16J 3/04 |
| 10,830,352 | B2 * | 11/2020 | Arikawa | F16J 15/52 |
| 2013/0319649 | A1 * | 12/2013 | Kim | B23K 37/003 |
| | | | | 165/185 |
| 2014/0179448 | A1 | 6/2014 | Collins et al. | |
| 2015/0253786 | A1 * | 9/2015 | Reed | F16K 31/126 |
| | | | | 137/510 |
| 2016/0138375 | A1 * | 5/2016 | Tanner | E21B 43/128 |
| | | | | 166/66.4 |
| 2017/0021451 | A1 | 1/2017 | Drexler et al. | |
| 2017/0241451 | A1 * | 8/2017 | Jewett | F02F 1/18 |
| 2018/0187786 | A1 | 7/2018 | Davey | |
| 2019/0195367 | A1 * | 6/2019 | Pehl | F16J 15/3468 |

FOREIGN PATENT DOCUMENTS

| | | | | |
|---|---|---|---|---|
| CN | 113914830 | A | 11/2022 | |
| DE | 1199560 | B * | 8/1965 | |
| DE | 19833758 | C1 * | 5/2000 | F16J 15/363 |
| EP | 0395278 | A1 * | 10/1990 | |
| EP | 1887263 | A1 * | 2/2008 | F16J 3/041 |
| EP | 2554787 | A1 | 6/2013 | |
| JP | 2009008184 | A * | 1/2009 | |
| WO | WO-2015200731 | A2 * | 12/2015 | F01B 19/04 |
| WO | 2016083918 | A1 | 6/2016 | |
| WO | 2016093706 | A1 | 6/2016 | |

OTHER PUBLICATIONS

Norwegian Search Report and Office Action in patent application No. NO20210177, dated Sep. 23, 2021.

* cited by examiner

METAL BELLOWS FOR DOWNHOLE USE

CROSS REFERENCE TO RELATED APPLICATIONS

This application claim priority to pending Norwegian application NO20210177 (filed Feb. 11, 2021), the entire contents of which is hereby incorporated by reference.

FIELD OF THE INVENTION

The present invention relates to a metal bellows for downhole use comprising: a bellows capsule with a first end and a second end; an inner diameter side and an outer diameter side arranged between the first end and the second end. The present invention also relates to a fluid dampening system connecting two fluid transport sections in a downhole tool. The present invention also relates to the use of said bellows and system, as well as a method of manufacturing a metal bellows capsule.

Thus, the present invention relates to equipment for downhole use, such as in hydrocarbon production, and in particular in downhole fluid injection systems.

BACKGROUND OF THE INVENTION

A bellows as described herein is essentially a corrugated metal pipe, i.e. a metal tube with a series of ridges and grooves running parallel to each other on its surface. The ridges and grooves follow a pattern that is perpendicular to and bisecting the centreline of the pipe. The height of the ridges in a corrugated pipe determines its degree of corrugation; the higher the number, the greater its flexibility. Unlike a normal inflexible metal pipe, the flexibility of metal bellows allows for numerous applications, e.g. as flexible pipe sections that can be adjusted in length and/or angle, or for forming seals, for example around a shaft.

There are two common methods of making corrugated metal tubing; hydroforming and welding. Hydroforming was developed first, and there are three major methods of hydroforming. In one method, a thin-wall tube sealed at one end is inserted into an apparatus which includes a plurality of spaced apart annular disks, each formed of two separable sections, the disks being spaced apart a relatively large distance. Pressure is applied to the open end of the tube, thus causing the wall of the tube to bulge into the spaces between the disks. The disks are then drawn toward each other to form the corrugations and then the sections of the disks are removed. This method is relatively quick and inexpensive, but the corrugated tubing thus produced is not very uniform. A second method is a variation of the first, in which, rather than pressurizing the tube a rubber cylinder is inserted into the tube and the rubber cylinder is then compressed, thus forming the bulges between the annular disks. The latter method is typically used for very large diameter corrugated tubing. In the third method of hydroforming, the convolutions are formed one at a time by hydraulically forming a bulge between a chuck plate and a shuttle. The shuttle is then moved toward the chuck plate to form a convolution, or corrugation, having a desired crest radius at its periphery and a desired trough radius between it and an adjacent convolution. This process is repeated along the tube until the desired number of corrugations is formed.

The welded plate method comprises forming a number of thin metallic annular disks. The disks are then put in forming dies which bend the disks so that, when the disks are stacked, alternating pairs of disks meet at either their inner or their outer peripheries. The contacting inner and outer peripheries are then welded, while using copper chill rings to prevent distortion. The disks are usually provided not flat, but with a wave-shaped cross-section, frequently a sine wave (S-shape), which stretches and relieves stresses as the corrugations are flexed.

A disadvantage of the hydroformed corrugated tubing is that it cannot be compressed "flat," that is, so that the corrugated tubing is only as long as the total of the individual thicknesses of metal, without destroying the spring of the bellows. This is because at each turn of a convolution, there is an internal radius of about 10 times, or greater, of the metal thickness. Hydroformed corrugated tubing, however, can be relatively easily extended from the normal position and can be used in either an expansion or compression mode. It is also tends to be more durable than welded corrugated tubing, as welds weaken with repeated compression cycles. But the hydroformed corrugated tubing is also a little weakened at where it was stretched in the hydroforming, typically more at sharper turns.

An advantage of the welded plate method is that the plates can be compressed flat because the individual segments touch and there is no internal radius where the edges of the individual segments meet. However, the welded plate method is very costly in that it requires a high amount of labour. A further disadvantage of welded plates is that they have a very low spring rate and can only be extended from their rest position a short distance and then only with a large amount of force; consequently, it is usually used in its neutral and compressed states, not extended. The overall extension/compression ratio of welded plates is typically on the order of about 4/1, and the size of that ratio is due primarily to compression distance. This ability of welded corrugated tubing to be compressed is especially important when there is a need for very small corrugated tubing, where hydroformed metal bellows are too big to be effectively used, such as in very small metal bellows used in downhole fluid injection valves. These metal bellows must be strong in order to endure high temperature, high pressure and corrosive fluids over many years while the injection fluid system is in downhole use, and yet small and flexible.

OBJECTS OF THE PRESENT INVENTION

There is a need for metal bellows that are as small and flexible like the current commonly used bellows made by the welded plate method, but with an extended lifespan. These bellows will eventually fail, usually as they shear at or in the vicinity of the welds. It is the object of the present invention to provide such improved bellows.

When developing metal bellows for downhole use, such as e.g. bellows for chemical injection systems, gas lift applications, or used as metal seals in downhole tools, there are some requirements that needs to be taken into account. The differential pressure across downhole bellows are commonly 2-3000 psi, as are a temperature variation from 0 to 250 degrees Celsius, the bellows will commonly be exposed to corrosive chemicals with a wide PH range, e.g. pH 3.5-9.0, and even higher for some specific applications, for chemicals injected with a chemical injection system.

In addition, there are often fairly restrictive size restraints on bellows in downhole tools. Bellows for chemical injection systems for example are very small, typically the overall length of such a bellows is around 3-8 cm, with a bellows stroke length of about 10% thereof, and an inner bellows diameter of 2-5 mm and outer bellows diameter of 10-15 mm. Therefore, replacing the currently used welded bellows with formed bellows is not feasible, as it is not possible with the current technology to make these small formed bellows with an acceptable compression.

Commonly held knowledge in this field is that small welded metal bellows for downhole tools experience the most stress on the outer diameter welds. Some of these assumptions are based on membrane stress analysis (the maximum bending the different areas are exposed to). But in our investigations, it has become apparent that the inner diameter welds of such welded bellows are where breakage occur first. Therefore, it is an object of the present invention to address this problem of the weakness of the welds on the inner diameter of the bellows.

It is not possible to simply use the hydroforming techniques described to form corrugated tubing with very small radii, as such would result in uncontrolled radii formation, the radii would become too sharp, radial wrinkles would form on the convolutions, and there could be crushing of the convolutions. The result of the latter would be that the corrugated tubing could not be extended from its crushed position.

Making formed bellows from a thinner metal sheet would also result in bellows that would be too thin to endure the long term stresses the bellows are under. Making welded bellows from a thicker material is also possible, and may improve the durability of the bellows somewhat, but the welds are still the weakest points of the bellows.

It is also an object of the present invention to provide a new method of manufacture of improved bellows for downhole use, and an improved downhole metal bellows seal system comprising metal bellows.

SUMMARY OF THE INVENTION AND PREFERRED EMBODIMENTS THEREOF

The metal bellows according to the present invention is characterized in that the bellows capsule comprises a first bellows convolution and second bellows convolution and optionally additional bellows convolutions; and each bellows convolution comprises: a root on the inner diameter side of the bellows capsule; a first sidewall extending from the root toward the outer diameter side of the bellows capsule with a first connection point at the distal end; a second sidewall extending from the root toward the outer diameter side of the bellows capsule with a second connection point at the distal end and wherein the second sidewall is on the opposite side of the root as the first sidewall;
wherein: the bellows convolutions are formed as a single piece; and the second sidewall connection point of the first bellows convolution is permanently affixed to the first sidewall connection point of the second bellows convolution.

Thus, the solution as presented herein is metal bellows where the outer diameter side turns are affixed, preferably by welding, while the inner diameter turns are formed, preferably hydroformed. The affixed turns then provide flexibility, enabling the bellows to be compressed as is necessary for many downhole applications, while the more rigid formed turns provide strength and added durability to the bellows as it is stronger than the known fully welded bellows on its weakest points (the inner diameter turns, also caled roots).

In accordance with a preferred embodiment of the bellows of the present invention the second side wall connection point of the first bellows convolution is permanently affixed to the first sidewall connection point of the second bellows convolution by welding. Although it is possible to permanently affix by other means, such as adhesives, mechanical means e.g. rivets or a physical locking system on the connection points, the abovementioned advantages of welding are far superior.

In accordance with another preferred embodiment of the bellows of the present invention the bellows convolutions are hydroformed. Examples of other ways of forming the convolutions as single pieces, i.e. from a single piece of uninterrupted metal, are that they may be rolled, pressed or cast. But the abovementioned advantages of hydroforming are far superior, and therefore preferred.

In accordance with another preferred embodiment of the bellows of the present invention the first sidewall and the second sidewall have a complementary surface shape. This allows for the sidewalls, as the bellows are compressed, to neatly pack together as close as possible, thus allowing for most possible compression. Any complimentary shape that allows for such maximal compression can be used, and this could be a simple straight or slightly curved sidewall shape, which would result in a U-shaped convolution, but most preferred this is a S-shape, which is also referred to as a sinusoidal shape, and is an industry standard shape. It provides the best seal between the side walls with less stress on the connection points and roots of the convolutions than a straight sidewall shape. Thus, it is preferred that the sidewalls have an S shape or that the convolutions have a U shape.

In accordance with another preferred embodiment of the bellows of the present invention all of the bellows convolutions have a single root. Then the resulting bellows capsule will have all affixed, preferably welded, connection points on the outer diameter of the bellows, and all formed, preferably hydroformed, roots on the inner diameter on the bellows. This allows for the best combination of durable formed corrugations on the inner diameter where they need to be strong, with less durable but more compressible affixed connection points on the outer diameter. The resulting bellows will be uniform on their outer and inner diameters, compressible enough to be used in place of all welded bellows yet stronger and more durable than an all welded bellows.

However, there are instances where there may be advantages to having one or more of the affixed, preferably welded connection points on the outer diameter of the bellows replaced by formed, preferably hydroformed crowns. For example, in the event that one would want to affix the middle of the bellows, or several points along a long bellows, to the surrounding outer housing, a formed crown would be stronger and thus able to take the strain of being affixed, and the rounded shape of it would lend itself better to affixing than the pointed shape of welded or otherwise already affixed connection points. E.g. a rounded crown could simply be screwed to the housing. If such a formed crown on the outer diameter had a larger diameter than the affixed points on the outer diameter, this would then prevent the affixed points form rubbing against the surrounding housing. Or alternatively the formed crown on the outer diameter could have a smaller diameter than the affixed points, but the housing could be provided with a protrusion it could be fixed to, or not, in which case the combination of the protrusion and shortened crown would still help keeping the bellows in place. Thus, in accordance with another preferred embodiment of the bellows of the present invention there are a different number of roots on the first bellows convolution and the second bellows convolution.

In accordance with another preferred embodiment of the bellows of the present invention, it further comprises a first end fitting attached to one end of the bellows and/or a second end fitting attached to a second end of the bellows. Such end fittings would allow for the bellows to be affixed at one or both of its ends. Advantages thereof will be further discussed below when the metal bellows seal system according to the present invention is discussed.

Metal bellows are in general used for many very different purposes, that all take advantage of their material strength and ability to be compressed and stretched. A common use is for instance as pipe connections, as unlike a normal pipe part, a pipe part with a metal bellows can be adjusted in relation to a pipe it connects to, to change angle or be shortened or lengthened. The metal bellows that are the object of the present invention are intended for downhole use. They may for example be used in place of O-rings, for forming a seal around a component, such as a shaft. This allows for replacing seals made from softer and therefore compressible materials, such as rubber O-rings, with seals made entirely from metal and better suited for downhole use at high pressure and temperature. The compressibility of the metal in the bellows makes this possible. Such seals can be intended to be fluid tight, and not let any fluid pass the bellows, or just intended to minimize the flow of fluids or slow down the movement of fluid. The bellows may also be used as fluid pressure sensitive "springs" connecting fluid conduits, where changes in up or downstream pressure will cause the bellows to dynamically contract and expand in response to said pressure changes, thus moving the fluid conduits in relation to each other. The system in accordance with the present invention is an example thereof.

The metal bellows seal system according to the present invention is characterized in that it comprises: a first section comprising a bellows mounting component with a through bore;

a second section comprising a bellows mounting component with a through bore; a metal bellows arranged between the first section and the second section wherein: the first section, second section, and metal bellows are arranged within a housing; a fluid path is established between the first section bore, an inner diameter of the bellows, and the second section bore; the first section and the second section can move with respect to each other in the axial direction; and there is no fluid connection through the bellows between an outer diameter and the inner diameter of the bellows. Thus, the bellows sit in the fluid moving through the system. The system acts as a dynamic seal where movement of sections thereof is pressure sensitive, and the flow is variable. This may be actuated by for example springs. The system will be arranged inside a housing that is part of the downhole tool it is arranged in. A preferred downhole tool the system may be part of is a chemical injection system, where it forms part of the injection valve. Other downhole tools the system may be part of are other components where such a dynamic response is important, for example gas lift applications.

In accordance with a preferred embodiment of the metal bellows seal system of the present invention the housing further comprises a housing chamber in fluid connection with the first section bore and the outer diameter of the bellows. This allows the pressure exerted by the fluid from the first section side to also be exerted on the outer diameter of the bellows, i.e. on the sides convolutions in fluid contact with the housing chamber.

In accordance with another preferred embodiment of the metal bellows seal system of the present invention, it further comprises a liner comprising a liner body, wherein: the liner is arranged in the fluid path between the first section and the second section wherein: the liner is attached to the first section and the liner body has a smaller diameter than the bore of the second section; a liner space is arranged between the liner body and the second section bellows mounting component, allowing for fluid communication between the bore of the second section bore and a liner chamber; wherein the bellows inner diameter is in fluid communication with the liner chamber. The liner may be a longitudinally welded tube attached at one end to the first section, which may optionally be the upstream end of the system. The outer diameter of the liner is small enough that the free, second section, which may optionally be the downstream end, will not interfere or contact the downstream end of the liner during movement of the system. Rather, the liner will fit into the second section with a space therebetween that the fluid can pass from the liner to the liner chamber where the bellows are located.

Adding a liner to the system has distinct advantages. In known uses of metal bellows in metal bellows seal systems in downhole tools, such as fluid injection systems, there is no liner and the fluid is simply allowed to flow into the bellows, mainly through the hole in the middle thereof formed by the inner diameter thereof but the fluid also enters the space around the bellows convolutions on the inner diameter. The bellows are directly exposed to the fluid flow, and the flow downhole tools may be exposed to is large enough for this to cause significant turbulence in the fluids around and in the bellows. Over time this may lead to wear on the bellows. By adding the liner, the fluids are not entering the bellows directly in the flow path, but in a more indirect matter, so the liner protects the inner diameter bellows convolutions from direct flow impingement, causing less turbulence and less stress and thus less wear on the bellows. Over time that adds up to a system with a longer lifetime expectancy.

In accordance with another preferred embodiment of the metal bellows seal system the metal bellows therein are the same metal bellows as described above as in accordance with the present invention.

Depending on the specific use of the metal bellows, they may or may not be affixed to the bellows mounting component or housing they are arranged in. When in a system in accordance with the present invention, the first and second sections of bellows mounting component are arranged to move axially in respect to each other. If the bellows are affixed to one or both mounting components, it will then ensure that it moves therewith. Depending on the system, it may then be desirable to have it attached to only one of the bellows mounting components, and free floating in relation to the other, as this will change how much strain is put on the bellows and how it functions as metal bellows seal system. If a liner is present, it would be preferable to have the bellows attached to the same side as the liner is attached to, i.e., the bellows mounting component of the first section, so that the first section with attached liner and bellows move together, while the second section move independently thereof. This would ensure a smooth interaction between the two sections and reduce wear and tear on the parts due to the relative movement between the two sections.

But, attaching the bellows is not always necessary, in some cases it may be not affixed, and just sit in the space between the two sections, acting as a free-floating bellows seal system. On the other hand, in some uses, it may be necessary to have the bellows thoroughly affixed to both sections. The bellows can be fitted with end fittings on the first and/or the second end of the bellows, as described for the bellows above, and affixed to the first and/or second sections by their bellows mounting components, respectively.

It is also possible to affix the bellows not by its end points through end fittings, but somewhere along its extended body, as described above by adding an extra crown to a convolution in place of a connection point to the outer diameter of the bellows if fixing to the surrounding housing, or if using a liner the inner diameter of the bellows could be fixed thereto.

Thus, in accordance with another preferred embodiment of the metal bellows seal system the bellows are affixed to the first section bellows mounting component, or the bellows are affixed to the second section bellows mounting component, or the bellows are not affixed to either bellows mounting component section, or the bellows are affixed to both bellows mounting component sections. More preferably the bellows are affixed only to the first section bellows mounting component, especially when a liner is present, and the liner is also affixed to the first section.

The present invention comprises use of the system of the present invention in a downhole chemical injection system.

The present invention comprises use of the bellows of the present invention for forming a fluid seal in a downhole fluid conduit.

The method of manufacturing a metal bellows capsule according to the present invention from formed bellows convolutions as described above is characterized in comprising the step of: (a) affixing a first bellow convolution to a second bellow convolution by permanently connecting the connection point of the second side wall of the first bellow convolution to the connection point of the first sidewall of the second bellow convolution.

In accordance with a preferred embodiment of the method of the present invention the method further comprises the steps: (b) affixing a new bellow convolution to the resultant bellow capsule of step (a) by permanently connecting a connection point of an unconnected sidewall of the bellow capsule to a connection point of a sidewall of the new bellow convolution; (c) repeating steps (a)-(b) until the desired length of bellows capsule is obtained. Thus, a metal bellows capsule of whatever plurality of convolutions one desires can be manufactured. Compared to a traditional welded bellows, only half as many welds or permanent connections will have to be made, and as this tends to be a time-consuming process this is advantageous for the production in addition to how said bellows have advantages as described earlier.

In accordance with another preferred embodiment of the method of the present invention the bellow convolutions are obtained by steps of: (i) producing a formed pipe, the formed pipe comprising a plurality of crowns formed on the outer diameter of the formed pipe, a plurality of roots formed on the inner diameter of the formed pipe, and a sidewall between each root and crown; (ii) cutting the formed pipe on the outer diameter, thereby (iii) resulting in a plurality of bellow convolutions with a formed root and a first side wall and a second side wall. Thus, the convolutions used in the method of the present invention are preferably obtained by obtaining a corrugated pipe by forming said pipe, and then cutting it up into separate bellow convolutions. These convolutions are then re-attached by affixing them in the method of the present invention to result in a half formed half affixed bellows, where the roots are formed and the distal ends of the side walls from the roots are affixed.

In accordance with another preferred embodiment of the method of the present invention the permanent connecting of step (a) is by welding. Although it is possible to permanently affix by other means, such as adhesives, mechanical means e.g. rivets or a physical locking system on the connection points, welding is preferred as earlier described. The conventional approach to welding metal bellows has been to use tungsten inert gas (TIG) to weld both the inside and outside joints. Unfortunately, TIG welding is relatively slow and may produce inconsistent quality welds. TIG welding also introduces a high level of heat energy to the metal structures which must be appropriately absorbed (using copper "chill rings") and diverted from the rings to prevent warping damage to the ring structures. To this end, a more precise and less heat-invasive laser welding process is preferably used to fuse bellows convolutions. Other welding methods, such as MIG, can also be used.

In accordance with another preferred embodiment of the method of the present invention it further comprises a step (a') before step (a) wherein the connection points are flattened. This allows for a better connection between the connection points, and will aid in the welding thereof.

In accordance with another preferred embodiment of the method of the present invention the formed pipe in step (i) and/or the formed bellow convolutions in step (a) is formed by hydroforming. As explained above for the metal bellows of the present application hydroforming is the preferred method of producing formed bellows, but it is possible to do so by other means, such as rolling, pressing or casting of a basic ring shape obtained by cutting said shape by for example stamping, laser-cutting, or water-jet abrasive cutting. A forming press for pressing is well known, and employ two opposing forming dies which press firmly into opposing sides of the metal to shape it.

DESCRIPTION OF THE FIGURES

The embodiments of the present invention will now be further described, by way of example only, with reference to the following figures wherein.

| | |
|---|---|
| Bellows | 1 |
| A first end fitting | 10 |
| A second end fitting | 11 |
| A bellows capsule | 20 |
| An inner diameter | 21 |
| An outer diameter | 22 |
| First bellows convolution | 30 |
| First bellows root | 31 |
| First sidewall | 32 |
| A first connection point | 321 |
| Second Sidewall | 33 |
| A second connection point | 331 |
| Crown | 34 |
| Second bellows convolution | 40 |
| First bellows root | 41 |
| First sidewall | 42 |
| A first connection point | 421 |
| Second Sidewall | 43 |
| A second connection point | 431 |
| Metal bellows seal system | 5 |
| First Section | 50 |
| Opening | 51 |
| Bore | 52 |
| Bellows mounting component | 53 |
| Second Section | 60 |
| Opening | 61 |
| Bore | 62 |
| Bellows mounting component | 63 |
| Liner | 80 |
| Liner Body | 81 |
| Liner Space | 82 |
| Liner Chamber | 83 |
| Housing | 90 |
| Housing chamber | 91 |
| Manufacture | |
| Formed Pipe | 70 |
| Pipe Root | 71 |
| Pipe Crown | 72 |
| Pipe Sidewall | 73 |
| Welded Bellows Capsule | 100 |
| Weld | 101 |
| Sidewall | 102 |
| Formed Bellows Capsule | 110 |
| Root | 111 |
| Crown | 112 |
| Sidewall | 113 |

DETAILED DESCRIPTION OF THE INVENTION

Figure 1A:
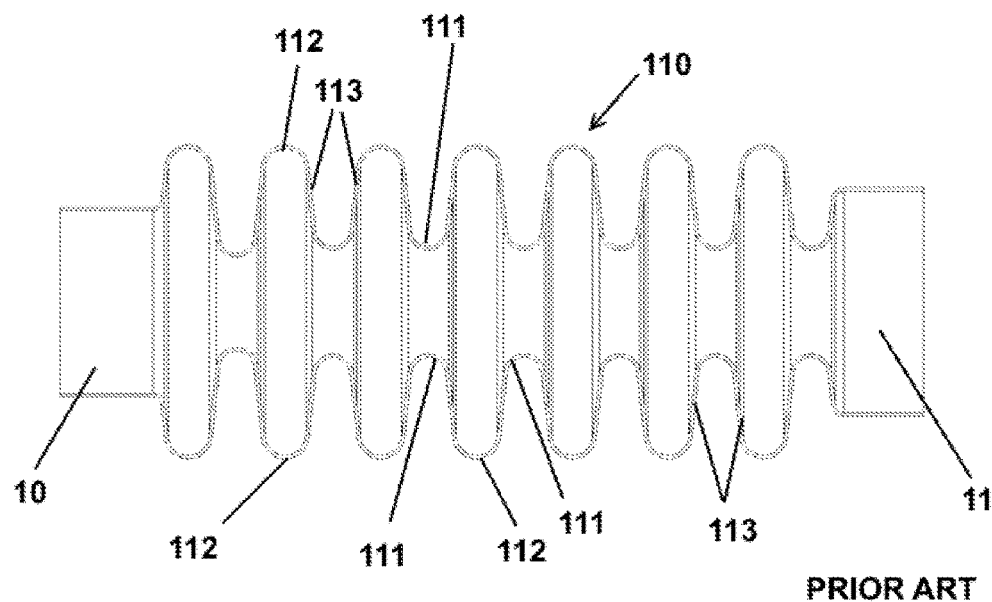
FIG. 1A—side view of a shaped bellows capsule (prior art)
Figure 1B:
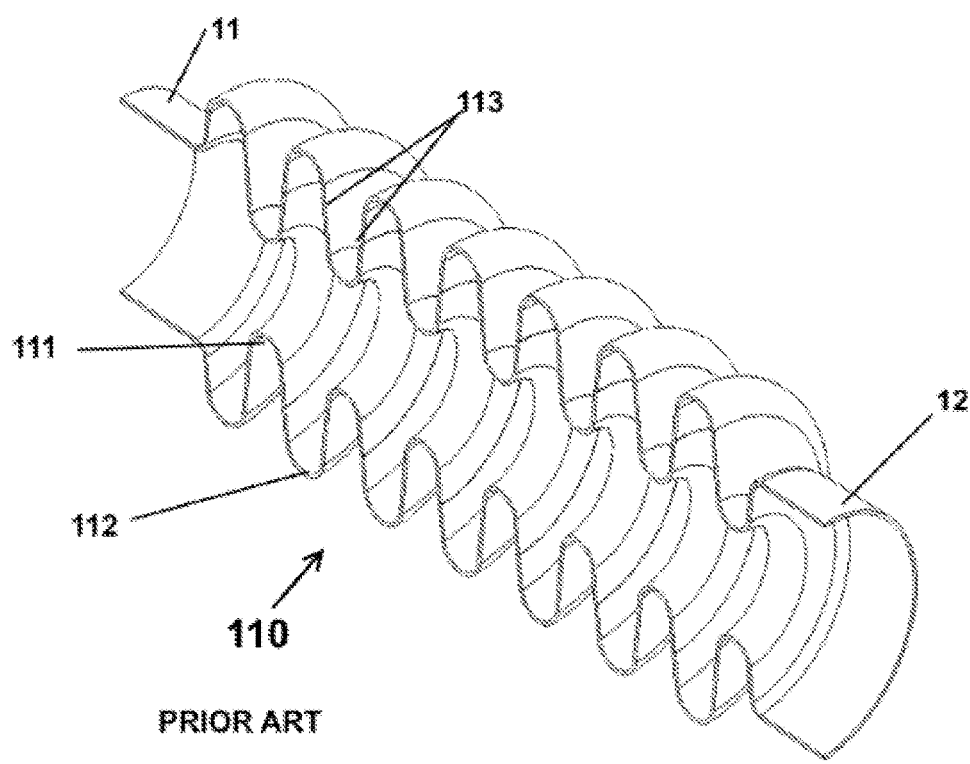
FIG. 1B—axial cross sectional perspective view of a shaped bellows (prior art)

FIGS. 1 and 2 shows examples of the prior art. FIGS. 1A and 1B shows a side view and an axial cross sectional perspective view, respectively, of a formed bellows 110. As can be seen, the turns on the outer 112 and inner 111 diameters of the formed bellows are wide, and are termed crowns 112 and roots 111, respectively. These bellows are strong and can be extended from their neutral state, but not compressed much due to how wide the roots 111 and crowns 112 are, so the side walls 113 will not be able to touch in a compressed state. The bellows not only has some flexibility in the axial direction (along the corrugated pipe), it will also allow some movement of the bellows in an annular direction. This formed bellows 110 is fitted with end connection pieces 10,11. The shaped bellows will usually be fluid tight as the pipe it was formed from, and fluid can pass through the inside via the connection pieces 10,11 or past the outside of the bellows.

Figure 2A:
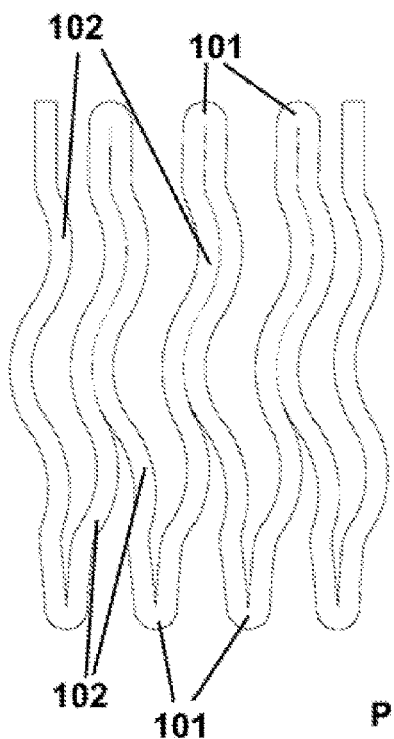
FIG. 2A—side view of a welded bellows capsule in an uncompressed state (prior art)
Figure 2B:
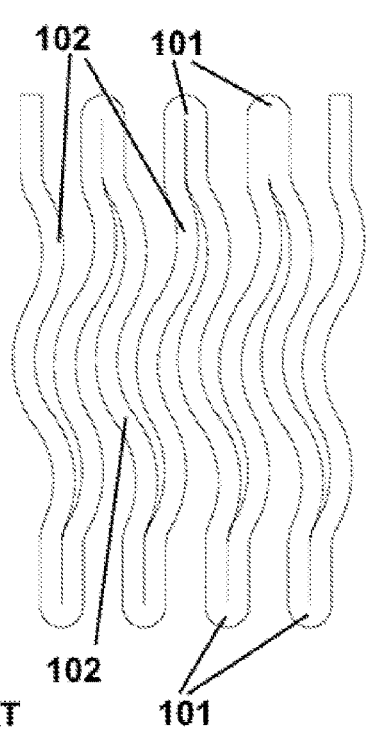
FIG. 2B—side view of a welded bellows capsule in a compressed state (prior art)

FIGS. 2A and 2B show a side view of a welded bellows capsule in an uncompressed and compressed state, respectively. Welded bellows are as described in the introduction usually made from rings/annular discs that are cut and shaped and welded together alternating at the inner and outer peripheries 101, so that each disc forms a sidewall 102. As can be seen these welds take up very little space in the axial direction in the uncompressed state, unlike the crowns 112 and roots 111 of the formed bellows of FIG. 1. They can also compress quite far, especially if the sidewalls have a complementary shape, but if extended the welds will break easily.

Figure 3A:
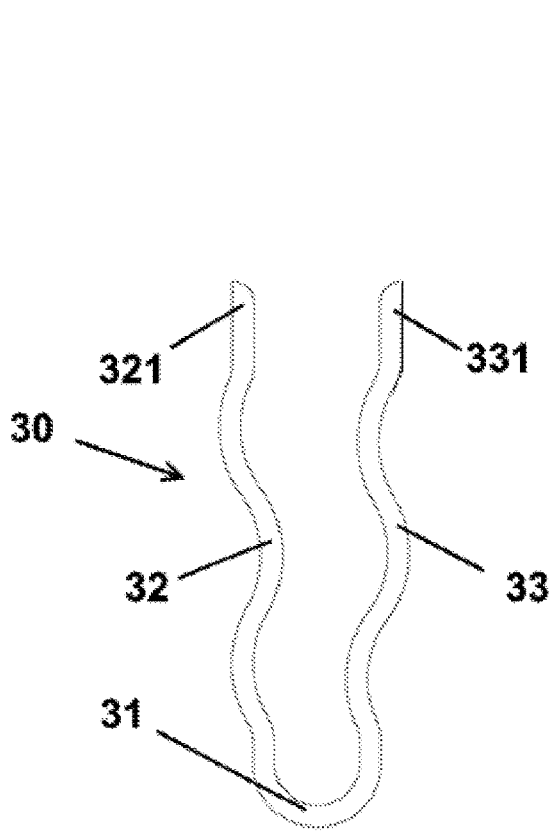
FIG. 3A—an axial cross section of the top portion of a single bellows convolution FIG. 3B—an axial view of a the top and bottom portion of a singles bellows convolution FIG. 4A—a perspective view of a bellows capsule FIG. 4B—an axial view of the top and bottom portion of a bellows capsule FIG. 4C—an axial view of the top portion of a bellows capsule FIGS. 5A-5B—side view of a bellows capsule in an uncompressed and compressed state FIGS. 6A-6D—Side views and perspective views of bellows capsules with different sidewall profiles FIGS. 7A-7B—Side and perspective view of a bellows capsule with a convolution with two roots connected to a convolution with one root FIGS. 8A-8B—perspective cross sectional view of a system with the bellows capsule linking two portions together FIGS. 8C—a side view closeup of the bellows capsule in a compressed and uncompressed state FIG. 9A—an axial view of the top and bottom portion of a formed pipe FIG. 9B—a cross section of the top portion of a formed pipe FIG. 10A—the shaped pipe after the crowns have been cut off forming separate bellows convolutions FIG. 10B—two separate bellows convolutions cut from the shaped pipe with straightened ends for better joining FIG. 10C—two bellows convolutions joined.
Figure 3B:
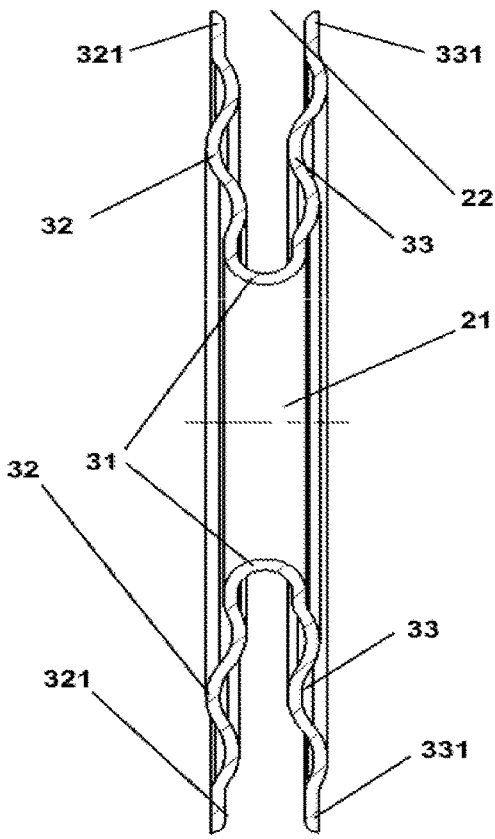

In known literature there is some discrepancy when naming the different parts of a metal bellows. Herein we will refer to one corrugation of the bellows, i.e. a first sidewall 32 extending from the outer diameter 22 to the inner diameter 21 and connecting to a second sidewall 33 extending back to the outer diameter 22, as one convolution 30. FIG. 3 show such a single bellows convolution 30. Specifically, FIG. 3A shows an axial cross section of the top portion thereof, while FIG. 3B show an axial view of a the top and bottom portion thereof. One such convolution 30 in accordance with the present invention is formed as one continuous piece, i.e. it is hydroformed or otherwise formed, and not assembled from multiple components. Thus, the turn at the inner diameter 21 is equivalent to the root 11 of the formed bellows in FIG. 1, if formed, and is referred to as a bellows root 31,41 herein. At the distal ends (away from the bellows root 31) of the first 32 and second 33 sidewalls, respectively, there are first 321 and second 331 connection points, respectively.

Please note that one convolution is a ring, not a flat disc, i.e. it has a hole through its middle. In FIG. 3B this hole is the inner diameter 21 shown between the root 31 of the upper convolution and the root 31 of the lower convolution. Thus, the ring/corrugated pipe extend all the way around. Usually, the bellows convolutions and resulting bellows capsule will be circular in shape, i.e. annular, as it is a corrugated pipe, but if desired it is of course possible to make it with a different shape, such as an oval axial cross section instead of a circular cross section.

Figure 4A:
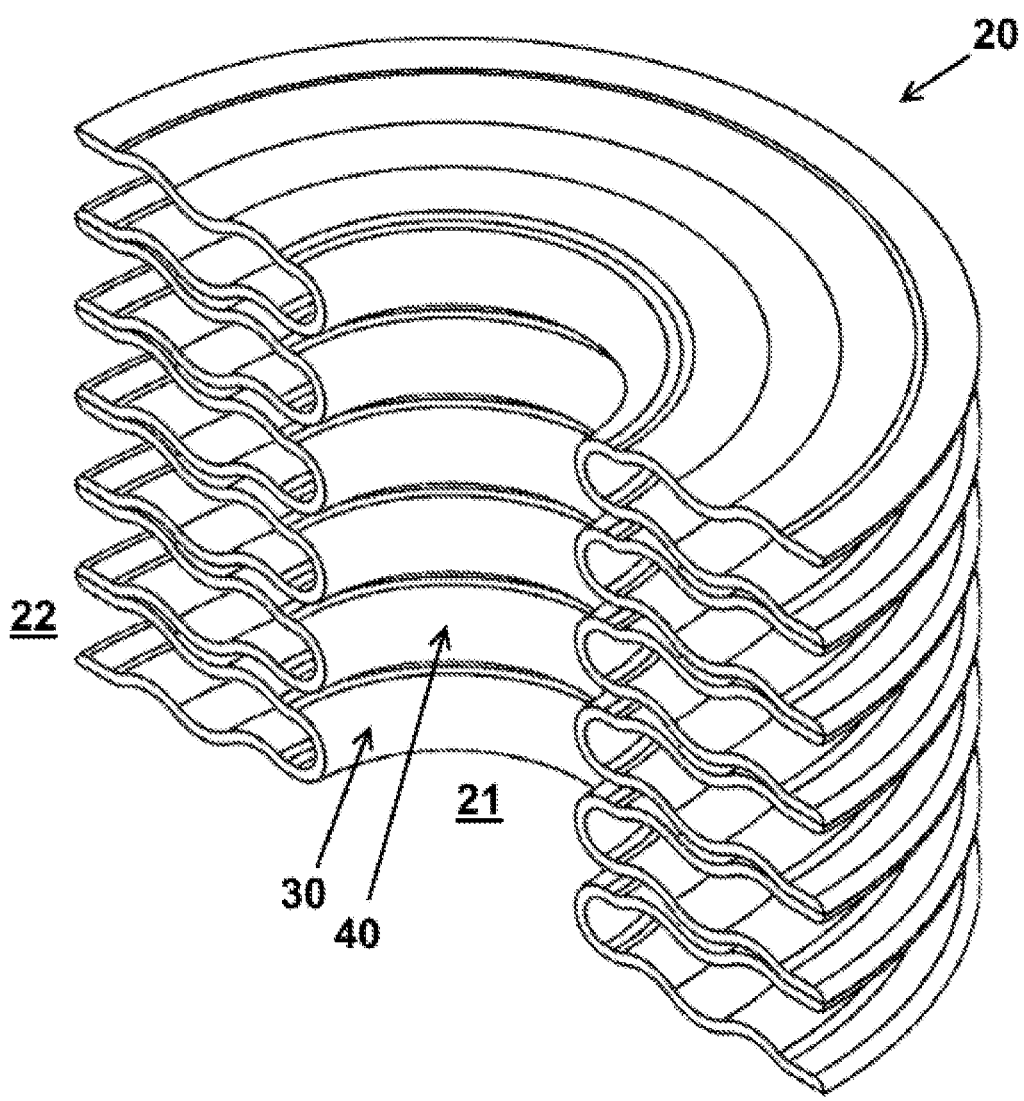
Figure 4B:
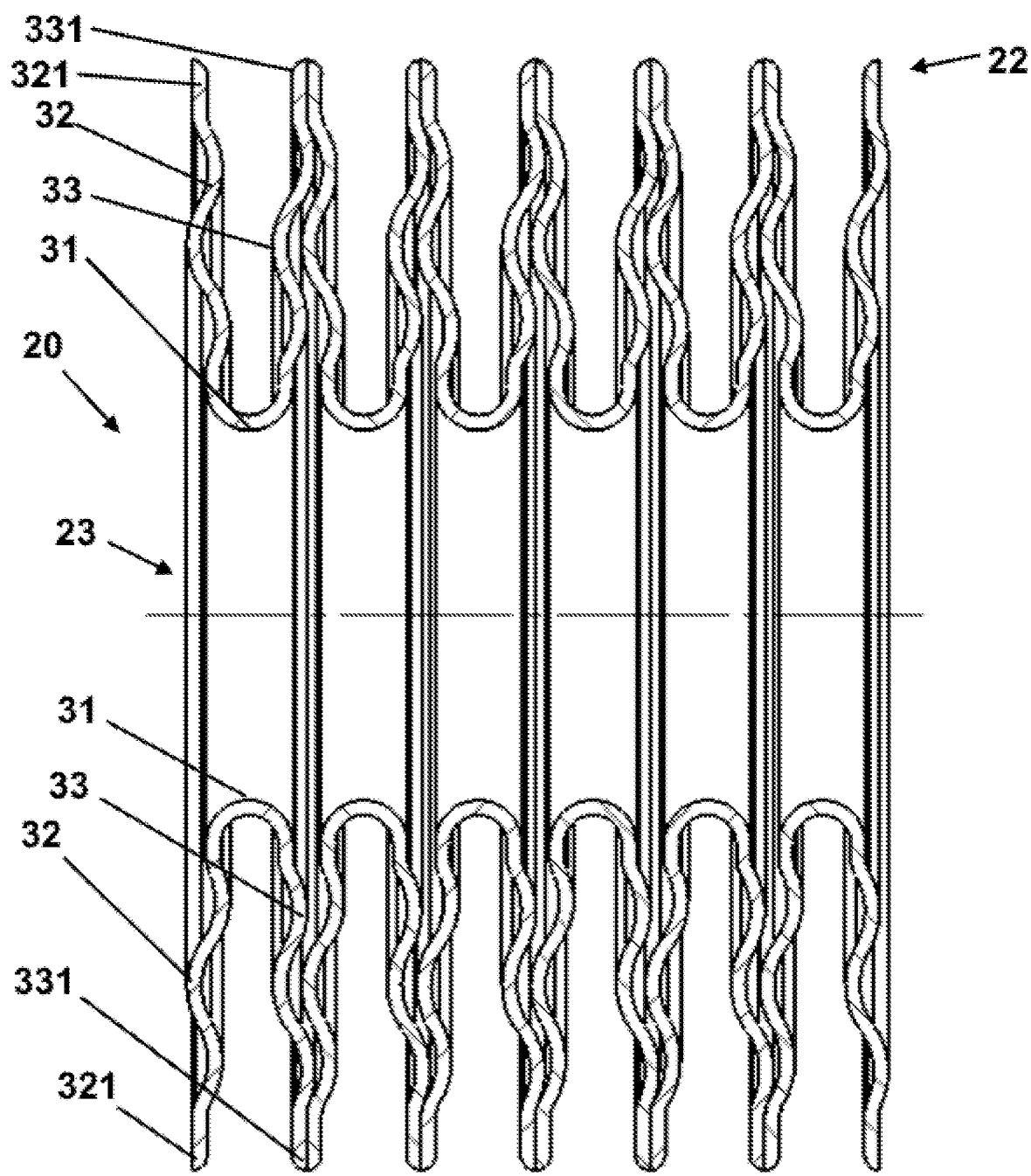

Two or more bellows convolutions in a row, connected at the outer diameter, forms a bellows capsule 20. FIG. 4A shows a perspective view of a bellows capsule made up of six bellows convolutions stacked. In other words, it shows a bellows capsule cut in two lengthwise. A first convolution 30 is fixed to the second convolution 40, and so on, with the inner diameters 21 and outer diameters 22 lined up, respectively. Thus, the bellows capsule 20 usually have a circular cross section, just like the bellows convolutions it is made from. FIG. 4B shows an axial view of the top and bottom portion of the bellows capsule of FIG. 4A, while FIG. 4C shows an axial view of its top portion only.

The connection points 321,331 between neighbouring convolutions 30,30A,30B,30C,30D,30E,30F are affixed to each other at the outer diameter 22 of the bellows capsule 20. Thus, the first convolution 30A starts at a first sidewall 32A, turns at the inner diameter 21 with a first bellows root 31A, and extends as a second sidewall 33A of the first convolution 30A, and is connected to the second convolution 30B by its first sidewall 32B, turns at the inner diameter 21 at a second bellows root 31B (of the second convolution 30B), and extends as a second sidewall 33B of the second convolution 30B, and is then connected to the third convolution 30C by its first sidewall 32B and so forth, in succession.

Figure 4C:
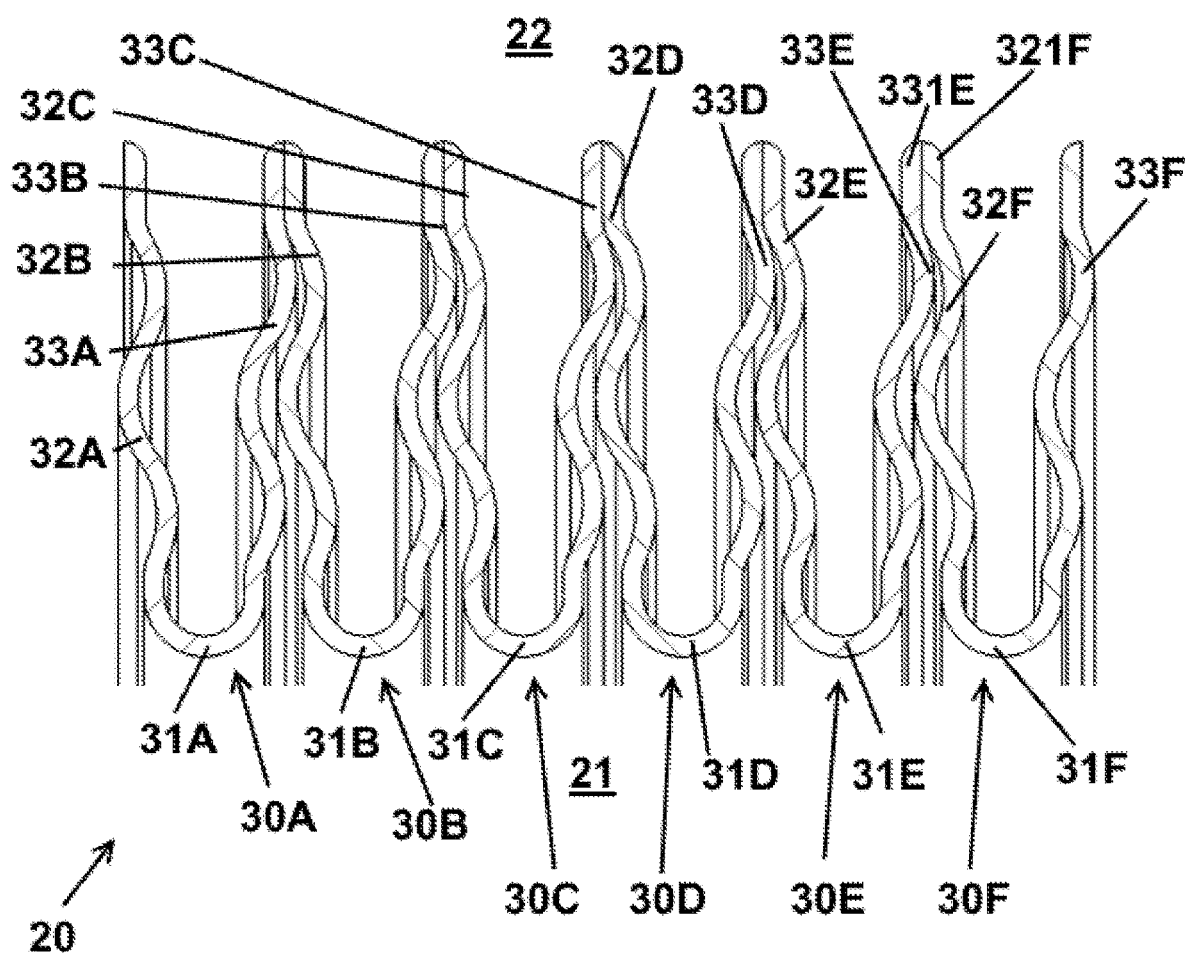

These connections at the outer diameter 22 where the sidewalls of two different convolutions are affixed, preferably by welding, for example between the right most convolution on FIG. 4C, 30F and the next convolution to the left of it 30E, are thus affixed at the point 321F of the left/first sidewall 32F of the right most convolution 30F and the point 331E of the right/second sidewall 33E of the convolution left of it 30E. Please note that in a traditional welded bellows capsule, the roots 31,31A,31B,31C,31D,31E,31F would not be formed roots, but rather weld points equivalent to these 321F, 331E weld points. Therefore, a fully welded traditional bellows capsule is made up of stacks of single sidewalls, not convolutions with two sidewalls.

Figure 5A:
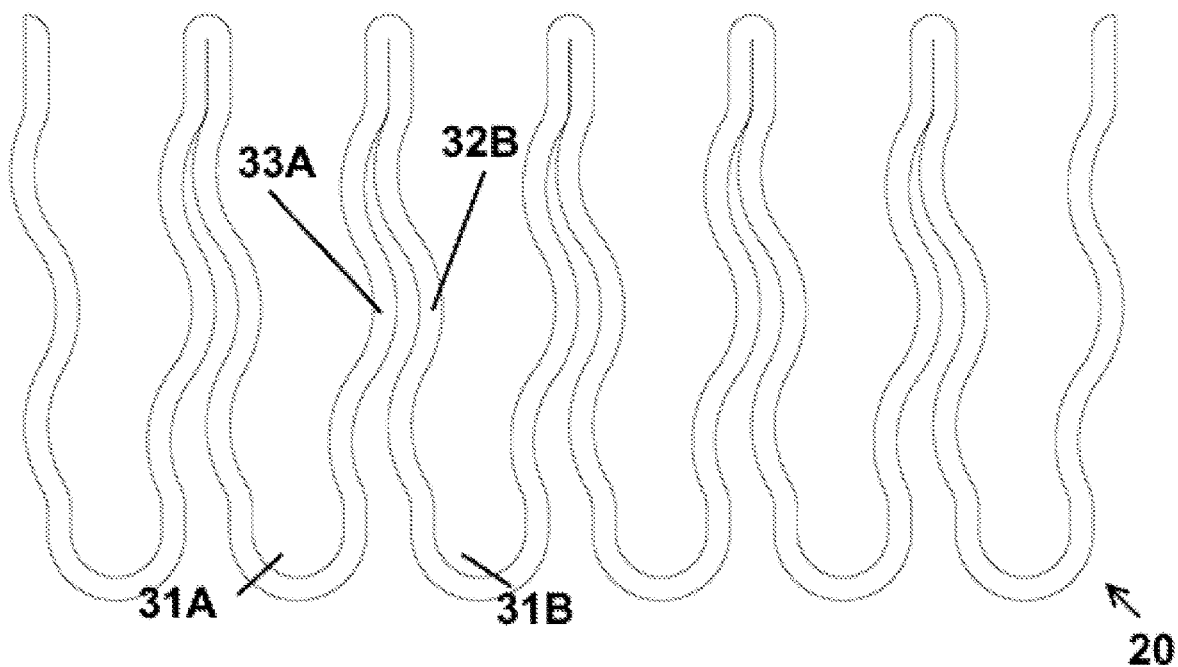
Figure 5B:
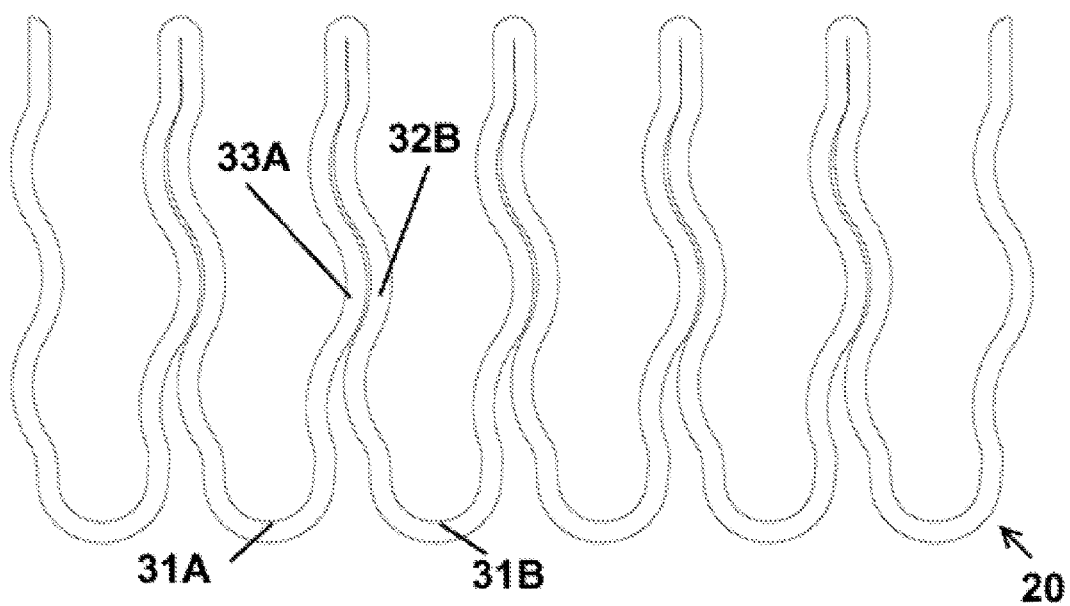

FIGS. 5A and 5B shows a side view of a bellows capsule 20 in accordance with the present invention in an uncompressed and compressed state, respectively. The bellows roots 31A,31B can not compress much, but the welds allow for more compression, so that the side walls 33A,32B can be pressed very close together, allowing for overall compression, unlike traditional formed bellows.

Figure 6A:
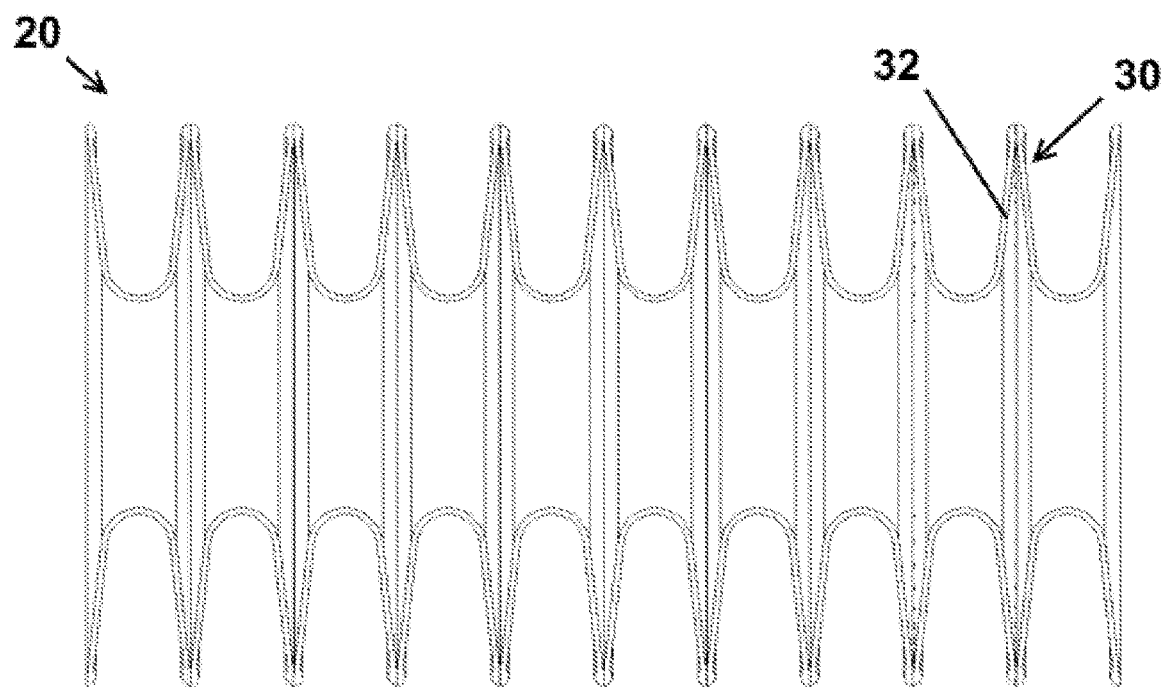
Figure 6B:
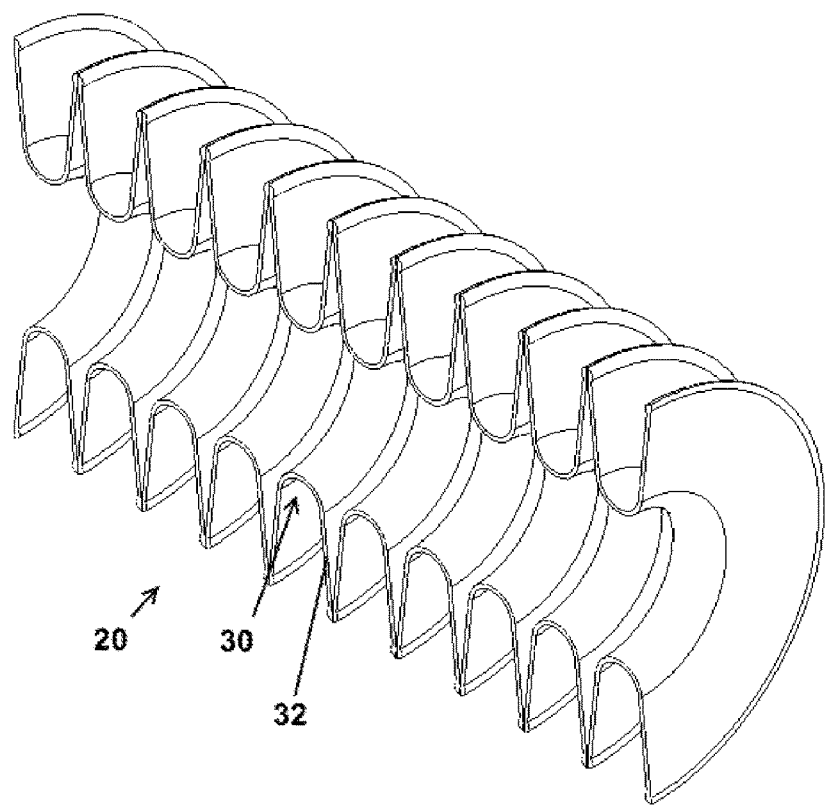
Figure 6C:
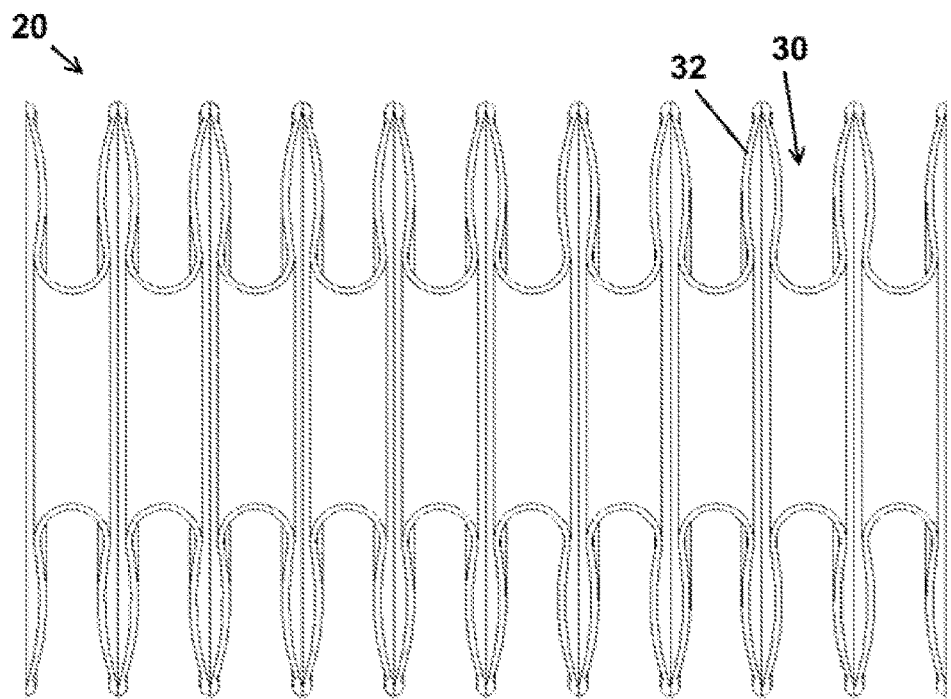
Figure 6D:
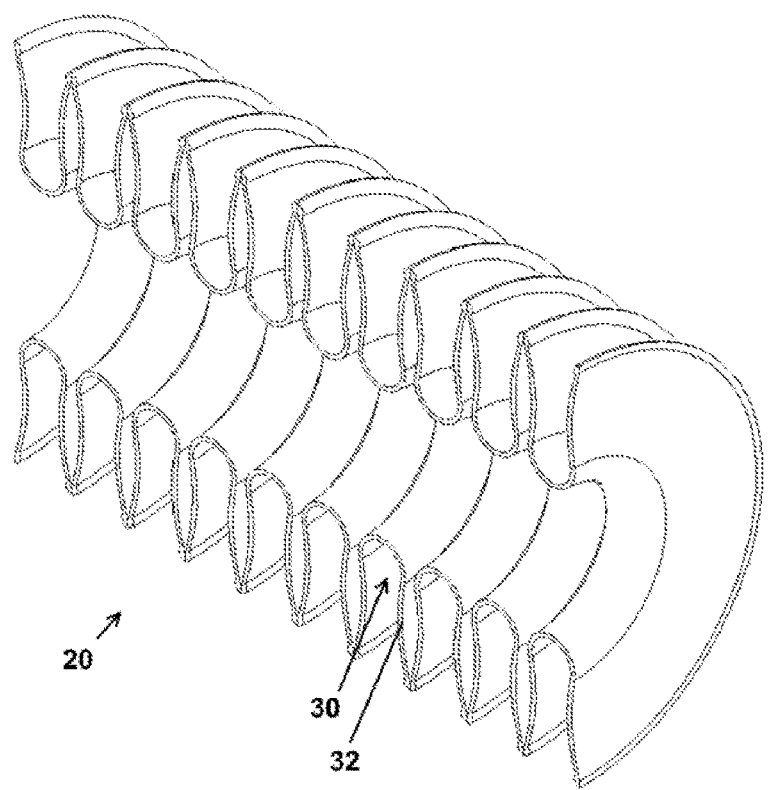

The sidewalls shown so far have had the traditional S-shape. This shape is advantageous because if a seal is desired between the sidewalls, it makes it harder for liquid to enter when compressed. This shape is also advantageous because it puts less pressure on the roots and connection points of the convolutions, transferring this to the sidewall curves instead. But it is possible to make the sidewalls with different shapes. FIGS. 6A to 6D show side views and perspective views of bellows capsules 20 with different sidewall profiles. FIGS. 6A and 6B shows convolutions 30 with straight side walls 32, i.e. a U-shaped convolution. This would be easier to produce that S-shaped sidewalls, since the walls do not have to be shaped, and would have stronger sidewalls that would compress less. FIGS. 6C and 6D shows a slightly different variety of the U-shaped convolution, where the sidewalls 32 are slightly curved towards the inside of the convolutions 30. It would take less force to make these sidewalls 32 compress than those of the U-shape, as they bow together close to the root. These are just examples of differently shaped sidewalls; others are of course also possible. The S-shape could for example be modified to have not two inside and outside turns on each side wall, as shown in FIG. 3A, but 3 or more outside and inside turns.

Figure 7A:
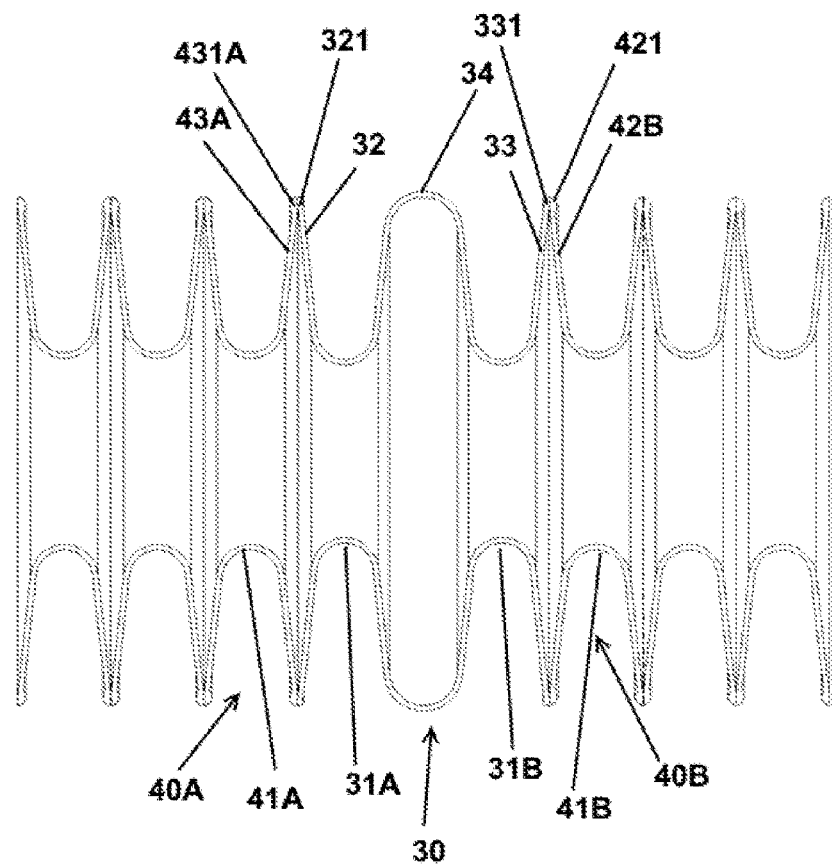
Figure 7B:
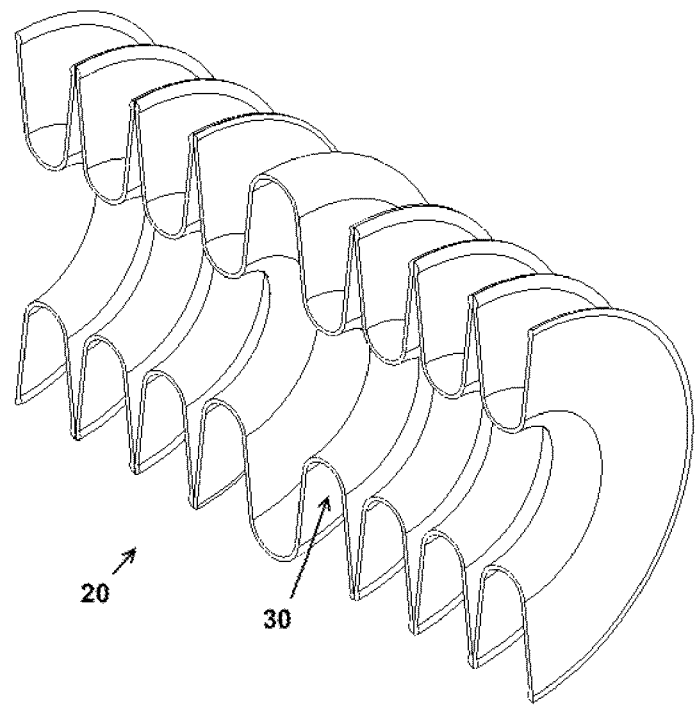

FIGS. 7A and 7B show a side and perspective view, respectively, of a bellows capsule with a convolution 30 with two roots connected to a convolution with one root. As explained in the Summary of the invention and preferred embodiments thereof, this may be advantageous in some special cases even though it is not usually the preferred embodiment of a bellows capsule in accordance with the present invention. For example, it may be necessary to add a crown 34 in order to add extra strength in the middle of a capsule, as shown here, if it is to be connected, or if it is more likely to contact any side wall and therefore needs the extra strength, etc. Here the convolution 30 with two roots starts at its first connection point 321, extends from the outer diameter to the inner diameter by a first sidewall 32 to a first bellows root 31A, then back by an intermediate sidewall to not a connection point but rather a formed crown 34, which in turn extends by a second intermediate sidewall to a second bellows root 31B, before the second sidewall 33 finally ends at a second connection point 331. At its left side this bellows convolution with two roots 31A,31B and one crown 34 thus connects by its connection point 321 to the neighbouring "normal" bellows convolution 40A with one root 41A only at its connection point 431A at the end of its right sidewall 43A. At its right side this bellows convolution with two roots 31A,31B and one crown 34 thus connects by its connection point 331 to the neighbouring "normal" bellows convolution 40B with one root 41B only at its connection point 421 at the end of its left sidewall 42B. The other convolutions to the left and right of the described convolutions are all "normal" convolutions in accordance with the present invention, i.e. with one bellows root 41 and two sidewalls 32,33 with connections points at their ends. It would be possible to add a convolution with even more roots and crowns, i.e. with 3 roots and 2 crowns, but for every crown added the bellows will become more rigid and less compressible. Likewise, it would be possible to make a bellows capsule with not one, but two or more convolutions with multiple roots, this could for instance be useful if the bellows were very long and several crowns for affixing it is desired.

Please note that as defined herein and shown in FIG. 7, the first and second sidewalls are where the bellows convolution connects to the sidewalls of the next convolutions, regardless of how many intermediate sidewalls are located therebetween.

Figure 8A:
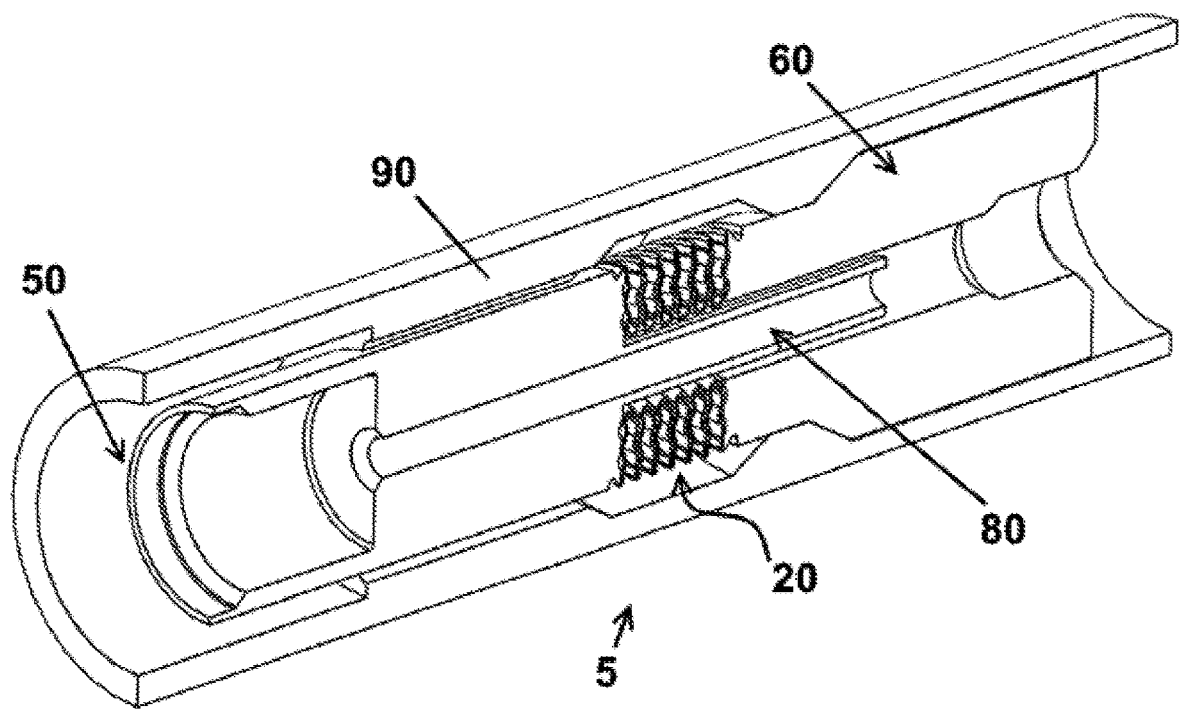
Figure 8B:
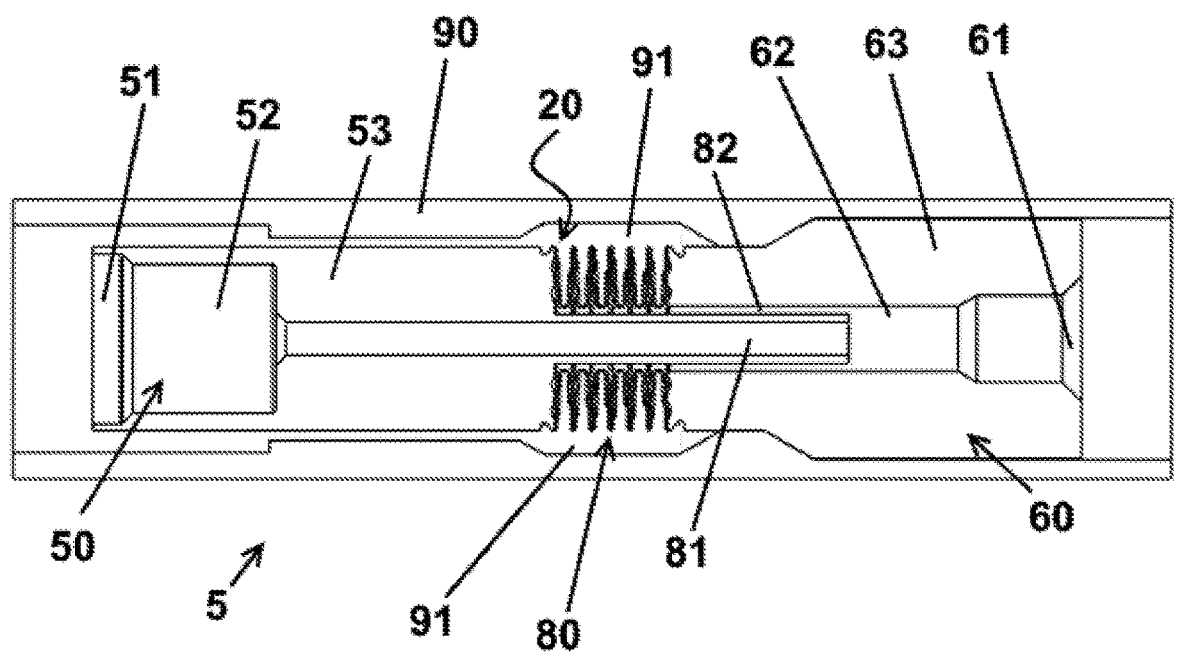

We will now describe the fluid sealing system 5 in accordance with the present application. FIGS. 8A and 8B show a perspective cross sectional view of the system 5 with a bellows capsule 20 linking two sections 50,60 together. One or both of the two sections 50,60 is arranged to be able to move, so that they move axially in relation to each other, towards or away from each other. The bellows 20 will compress and lengthen as the sections 50,60 move. There is a flow path from the opening 51 in the first section 50, through the bore 52 of the first section, through the inside portion of the bellow 20, into the bore 62 of the second section, and out through the opening 61 in the second section.

Figure 8C:
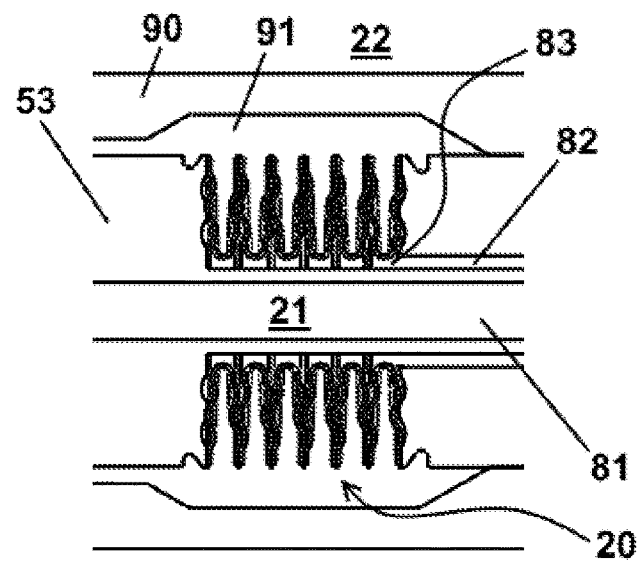

FIGS. 8A and 8B show a liner 80 arranged between the first bore 52 and the second bore 62. FIG. 8C shows a side view closeup of the bellows capsule in FIGS. 8A and 8B. The liner 80 moves the fluid past the bellows 20. There are several advantages to a liner 80. It acts to insulate the bellows. Without a liner, the fluid passing through the system will enter the bellows directly and can create a lot of turbulence in the bellows 20. With a liner 80 the bellows 20 are still in fluid communication with the system 5, but not directly in the main flow path. Rather, the fluid is flow on the outside of the liner 81 from the end thereof where it can flow into the narrow liner space 82 between the outside of the liner 81 and the inside of the second section housing bellows mounting component 63, into the liner chamber 83 where the bellows capsule 20 is arranged. Another way that a liner 80 can help to protect the bellows 20 is by reducing the flow rate of abrasive particles past the bellows during operation. Note that the liner 80 is not required for the system to function as intended. Depending upon operating conditions, materials, and goals, the system may be acceptable without it.

This is a much less direct fluid path, and there will be less turbulence in the bellows capsule 20 as the sections 50,60 move relative to each other and the fluid is moved in and out of the expanding and contracting liner chamber. Please note that reference number 83 herein denotes not just where the fluid enter/exit but the entire chamber the bellows capsule rests in.

If the flow liner is present, the fluid flows through the first section into the flow liner body 80, and into the second section 60. The flow liner body preferably has a smaller diameter than the second section bore 62. This creates a liner space 82 between the flow liner body 81 and the second section bellows mounting component 63. This liner space 82 is in fluid communication with a liner chamber 83. The liner chamber 83 is in fluid connection with the inner diameter 21 of the bellows 20. Note that there is not a fluid connection between the inner diameter 21 and outer diameter 22 of the bellows. Thus, the bellows create a seal/barrier between the outer diameter and inner diameter. Note that if the seal is not perfect, but allows some small amounts of fluid to pass between the outer and inner diameters of the bellows, the system will still work as long as the bellows still slow down fluid motion so that this is not a major fluid path.

In another embodiment with the flow liner 80, there is a fluid connection between the first section bore 52 and a housing chamber 91 in the housing 90. The housing chamber 91 is in fluid connection with the outer diameter 22 of the bellows. A way of achieving this is shown in FIG. 8. As the first section 50 has a smaller outer diameter than the inner diameter of the housing 90, there is a fluid connection that allows the housing chamber 91 to contain fluid on the outer diameter 22 of the bellows 20. It is possible to have an embodiment with both the housing chamber 91 and the liner chamber 82.

In such a manner, the metal bellows seal system 5 allows the downhole tool to isolate pressure applied through fluids entering through the opening 51 of the first section 50 from the pressure applied through fluids entering through the opening 61 of the second section 60 by letting the fluids entering the first section 50 having fluid communication with the outer diameter of the bellows, while the fluids entering the second section 60 have fluid communication through the flow path including the inner diameter of the bellows. This allows for the bellows to be affected separately by the pressure from the first section 50 and the second section 60.

For example, if a valve is used to control the flow of fluid into the first section bore 52 (and/or flow liner 80), this would apply two different pressures on two different sides of the bellows. The pressure in the housing chamber 91 would be the same as that above the valve. The part of the bellows that was on the outer diameter 22, through fluid communication with the housing chamber, would also be at the pressure from above the valve. Below the valve, the pressure would be that from the second section bore 62. The inner diameter 21 of the bellow 20 is in fluid communication with the second section bore 62 and would be at that pressure. This would be the same without the flow liner 80 in the system.

One advantage about having both sides of the bellows experiencing different fluid pressures (with or without a liner 80) is that it makes the bellows act like a dynamic seal used to isolate pressure from the upper chambers and the lower chamber. In addition, the motion of the bellows with the flow liner will help to remove undesirable high frequency vibrations. This will reduce the wear on the bellows and make the system more stable. Another advantage is that the bellows are better able to respond to changes in pressure from the first and the second section because the bellows are in contact with both pressures.

While conventional kinds of bellows could possibly benefit from having a different fluid pressuring on the inside and the outside of the bellows, the type of bellows disclosed previously using shaped convolutions are particularly well adapted. One reason for this is that there is more volume on the outer diameter side between the sidewalls 32 of the same convolutions 30, than there is on the inner diameter side between the sidewalls 32 of neighbouring convolutions 30.

In this way, the system is well suited for use with a chemical injection fluid system.

Figure 9A:
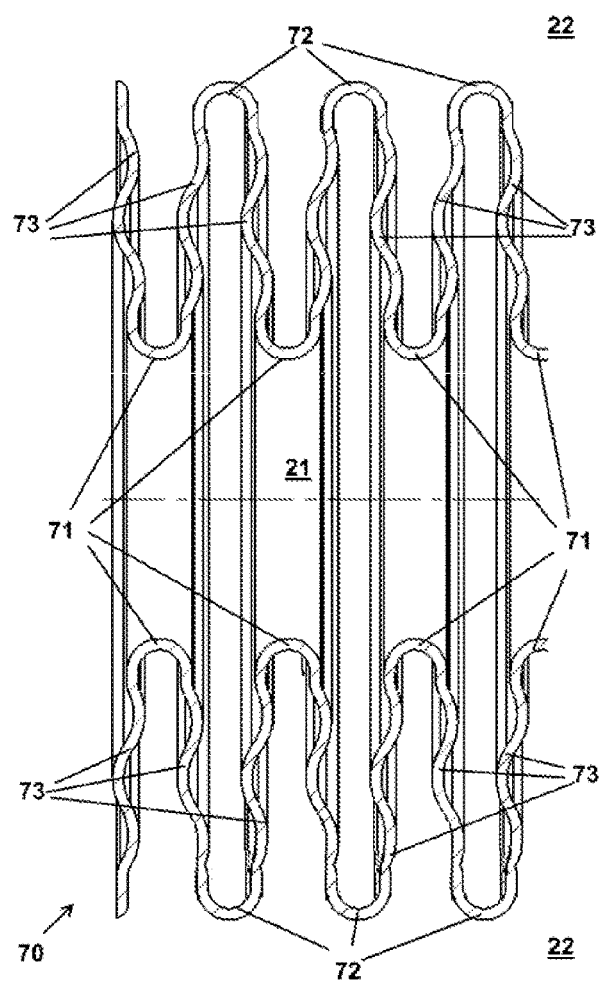
Figure 9B:
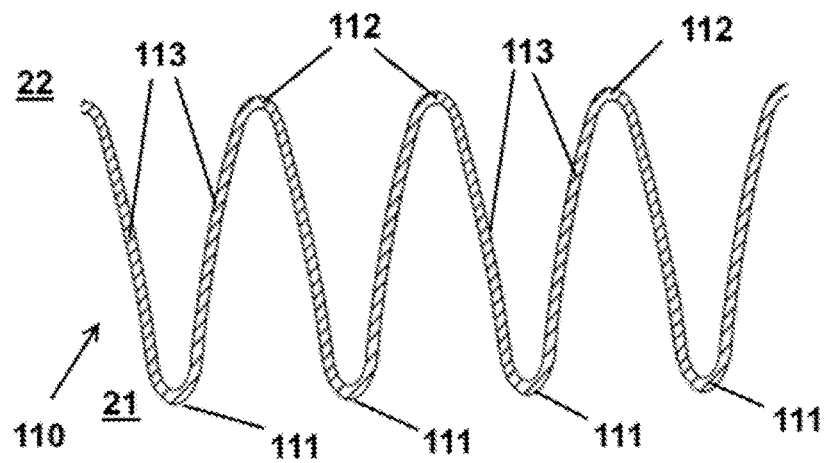
Figure 10A:
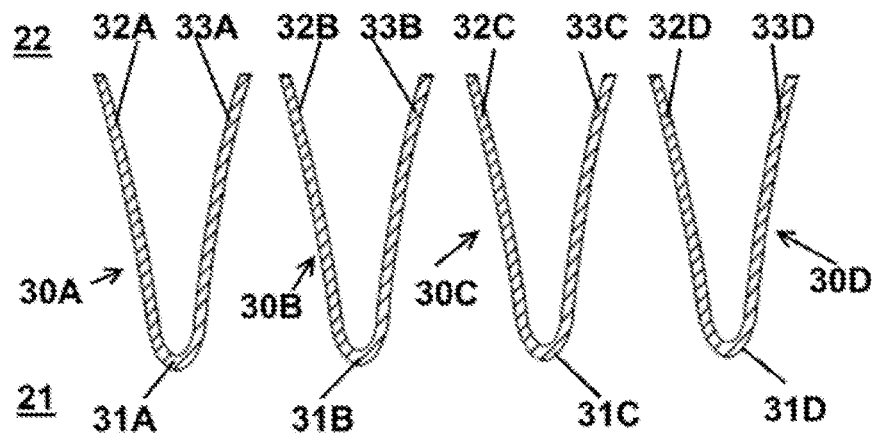

We will now describe the manufacturing of the bellows capsule in accordance with the present invention. The manufacture requires formed convolutions to first be made, and then affixed. As described in the summary of the invention and preferred embodiments thereof above, there are different methods of producing formed bellows capsules. A preferred embodiment of the method in accordance with the present invention is described with reference to FIG. 9. FIG. 9A show an axial view of the top and bottom portion of a formed corrugated pipe. The capsule section shown in FIG. 9A is of the known formed type, as shown earlier in FIG. 1. But instead of using it as is, in accordance with this embodiment of the method of manufacture, it will be cut into bellows convolutions that will then be used in the manufacture of the bellows of the present invention. The formed capsule section has pipe roots 71 and pipe crowns 72 connected by pipe sidewalls 73. A simplified version thereof, not showing shaped sidewalls but rather a simplified cross section of the top portion of a formed pipe, is shown in FIG. 9B. Here too there are formed roots 111 at the inner diameter 21 and formed crowns 112 at the outer diameter 22 of the formed capsule. The crowns 112 are then cut off, leaving separate convolutions as can be seen in FIG. 10A. Please note that if one wish to make convolutions with two or more roots and one or more crowns, as discussed above, one would simply leave one or more of the crowns 112 intact.

Figures 10B, 10C:
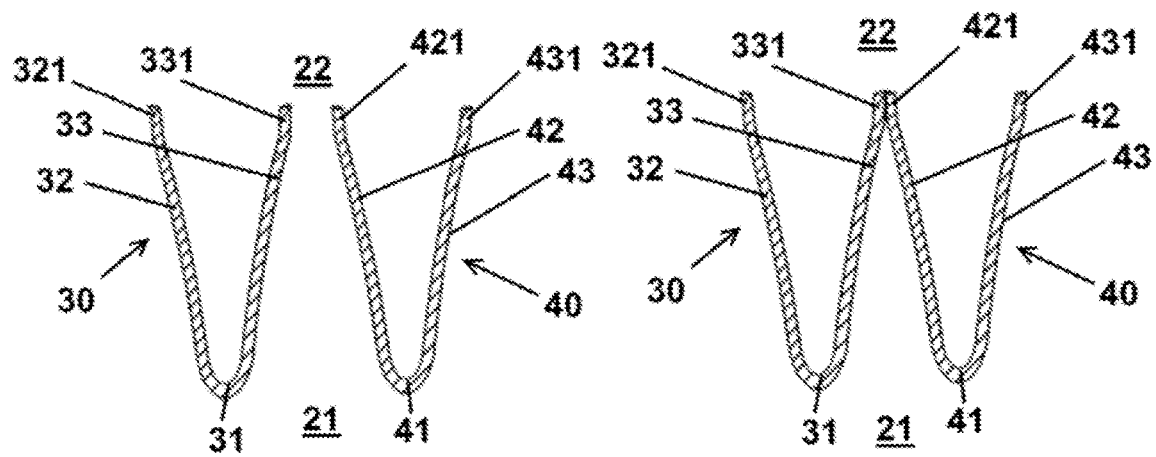

In accordance with the method of manufacture of the present invention, individual bellows convolutions are now affixed to each other. FIG. 10A show the shaped pipe after the crowns have been cut off forming four separate bellows convolutions 30A,30B,30C,30D, each with a single formed bellows root 31A,31B,31C,31D, and a first sidewall 32A,32B,32C,32D and a second sidewall 33A,33B,33C,33D. Note that the ends of the sidewalls would have tips/connection points that are pointing outwards. In accordance with a preferred embodiment, these tips/connection points are straightened, as can be seen in FIG. 10B, so they will fit flatly against each other in order to be easier to affix as they will have better surface area contact. FIG. 10B therefor show two separate bellows convolutions 30,40 cut from the formed pipe with straightened ends 321,331,421,431 for better joining. In FIG. 10C the two bellows convolutions 30,40 are joined at their connection points 331,421 at the end of the second sidewall 33 of the first convolution 30 and the end of the first sidewall 42 of the second convolution 40. This results in a bellows capsule with a first sidewall 32 with a not connected connection point 321, two formed bellows roots 31,41, with an affixed outer diameter 22 connection point therebetween, and a second sidewall 43 of the second convolution 40 with a not connected connection point 431. More convolutions can now be added to this capsule by affixing to the not connected end points, until the desired length thereof is reached.

Figure 11A:
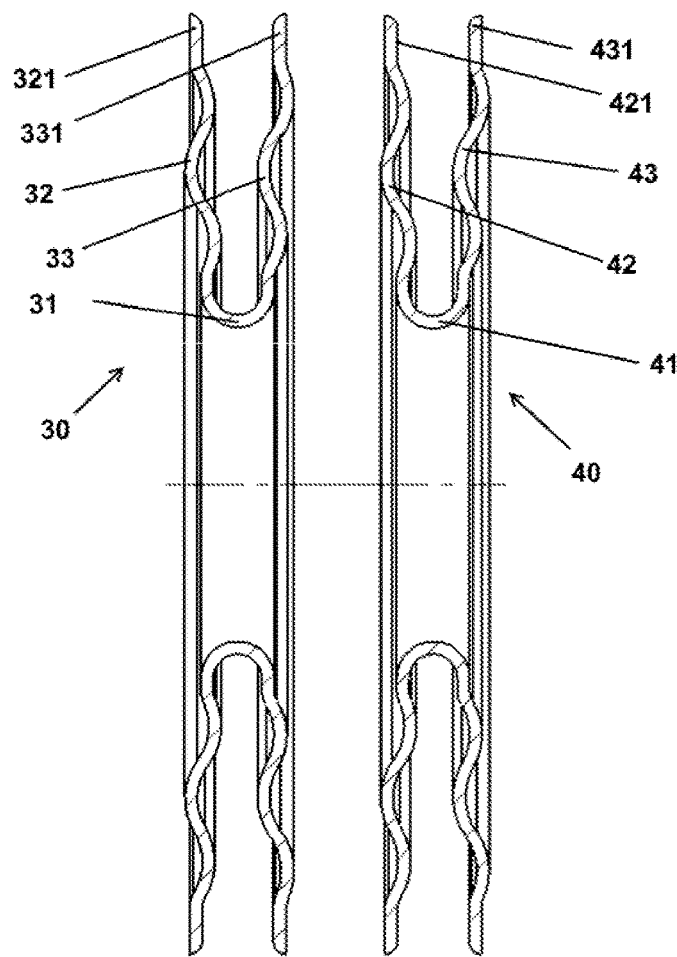
FIG. 11A—an axial view of a the top and bottom portion of two separated bellows convolutions FIG. 11B—a side view of the top portion of two joined bellows convolution Index of the reference numbers used in the figures and in the following detailed description of the invention.
Figure 11B:
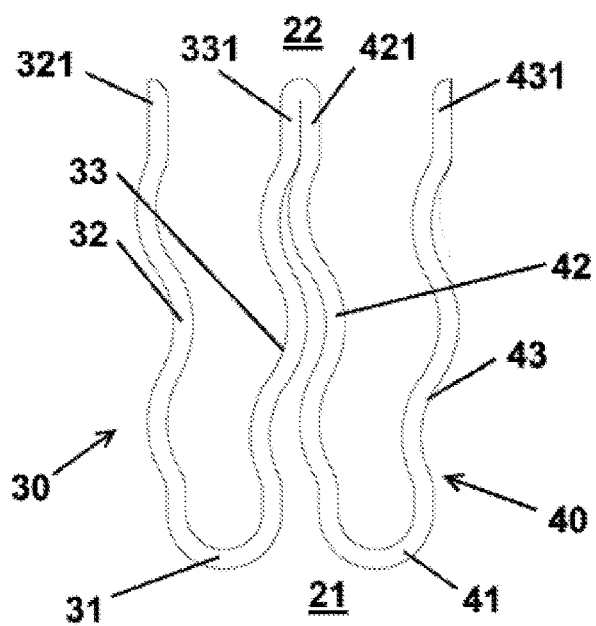

FIG. 11A—shows an axial view of the top and bottom portion of two separated bellows convolutions before they are joined, i.e. in 3D view instead of the simplified 2D view of FIG. 10. The connection point 331 of the second sidewall 33 of the first convolution 30 will be joined to the first sidewall 42 of the second convolution 40 at its connection point 421. The first sidewall 32 of the first convolution 30 can then be joined at its connection point 321 to another (not shown) convolution, or the second sidewall 42 of the second convolution 40 can be joined at its connection point 431 to another (not shown) convolution. FIG. 11B shows a side view of the top portion of the two joined bellows convolutions close up.

Regarding material choice, metal bellows can be made from many different metals, the metal types suitable for this use is known art and not the object of this application. The type of metal will depend on the specific conditions the downhole tool is to be used in, and will often entail high pressure and high temperature, as well as a corrosive fluid environment. In general metal bellows are made in steel (preferably stainless steel), bronze, titanium, aluminium, or a variety of alloys. For downhole purposes, and in particular fluid injection systems, Nickel alloys are preferred.

It is hereby claimed:

1. A metal bellows seal system (5) in a downhole tool, characterized by that it comprises:
    a first section (50) comprising a bellows mounting component (53) with a through bore (52);
    a second section (60) comprising a bellows mounting component (63) with a through bore (62);
    a metal bellows (20, 1) arranged between the first section (50) and the second section (60)
    wherein:
        the first section (50), second section (60), and metal bellows (20, 1) are arranged within a housing (90);
        a fluid path is established between the first section bore (52), an inner diameter (21) of the bellows (20, 1), and the second section bore (62);
        the first section (50) and the second section (60) can move with respect to each other in the axial direction;
    further, one or both of configuration (A) and/or configuration (B):
        (A) wherein there is no fluid connection through the bellows between an outer diameter (22) and the inner diameter (21) of the bellows (20, 1); and
        wherein the housing further comprises a housing chamber (91), in fluid connection with the first section bore (52) and the outer diameter (22) of the bellows (20, 1);
        and/or
        (B) further comprising:
        a liner (80) comprising a liner body (80), wherein:
            the liner is arranged in the fluid path between the first section (50) and the second section (60) wherein:
            the liner is attached to the first section (50) and the liner body has a smaller diameter than the bore (62) of the second section (60);
        a liner space (82) is arranged between the liner body (80) and the second section bellows mounting component (63), allowing for fluid communication between the second section bore (62) and a liner chamber (83);
        wherein the bellows inner diameter (21) is in fluid communication with the liner chamber (83).

2. The system according to claim 1, wherein the bellows (1) are affixed to the first section bellows mounting component (53).

3. The system according to claim 1, wherein the bellows (1) are affixed to the second section bellows mounting component (63).

4. The system according to claim 1, wherein the bellows (1) are not affixed to either bellows mounting components (53,63).

5. The system according to claim 1, wherein the bellows (1) are affixed to both bellows mounting components (53, 63).

6. The system according to claim 1, wherein the bellows (1) are not affixed to the first section bellows mounting component (53).

7. The system according to claim 1, wherein the bellows (1) are not affixed to the second section bellows mounting component (63).

8. The system according claim 1, wherein the metal bellows (20, 1) comprises:
    a bellows capsule (20) with a first (10) end and a second (11) end; an inner diameter side (21) and an outer diameter side (22) arranged between the first end (10) and the second end (11);
    characterized in that:
    the bellows capsule (20) comprises a first bellows convolution (30) and second bellows convolution (40); and each bellows convolution (30,40) comprises:
        a root (31,41) on the inner diameter side of the bellows capsule (21);
        a first sidewall (32,42) extending from the root (31,41) toward the outer diameter side of the bellows capsule (22) with a first connection point at the distal end (321, 421);
        a second sidewall (33,43) extending from the root (31,41) toward the outer diameter side of the bellows capsule (22) with a second connection point at the distal end (331,431) and wherein the second sidewall (33,43) is on the opposite side of the root as the first sidewall (32,42);
    wherein:
        the bellows convolutions (30,40) are formed as a single piece; and
        the second sidewall connection point (331) of the first bellows convolution (30) is permanently affixed to the first sidewall connection point (421) of the second bellows convolution (40).

9. The system according to claim 8, wherein the second side wall connection point (331) of the first bellows convolution (30) is permanently affixed to the first sidewall connection point (421) of the second bellows convolution (40) by welding.

10. The system according to claim 8, wherein the first and second bellows convolutions (30,40) are hydroformed.

11. The system according to claim 8, wherein the first sidewall (38,48) and the second sidewall (331,431) have a complementary surface shape.

12. The system according to claim 8, wherein all of the bellows convolutions (30,40) have a single root.

13. The system according to claim 8, wherein there are a different number of roots on the first bellows convolution (30) and the second bellows convolution (40).

14. The system according to claim 8, wherein the bellows (20, 1) further comprises a first end fitting (10) attached to one end of the bellows (1) and/or a second end fitting (11) attached to a second end of the bellows (1).

15. The system according to claim 8, wherein the shape of the bellow convolutions (30) is s-shaped.

16. A method of manufacturing a metal bellows capsule (20) comprising steps of:
    (a) affixing a first bellow convolution (30,30A) to a second bellow convolution (40,30B) by permanently connecting the connection point (331) of the second side wall (33,33A) of the first bellow convolution (30,30A) to the connection point (421) of the first sidewall (42,32B) of the second bellow convolution (40,308);

(b) affixing a new bellow convolution (30C) to the resultant bellow capsule (20) of step (a) by permanently connecting a connection point of an unconnected sidewall (33B) of the bellow capsule (20) to a connection point of a sidewall (32C) of the new bellow convolution (30C);

(c) repeating steps (a)-(b) until the desired length of bellows capsule (20) is obtained;

wherein the bellow convolutions (30,40,30A,30B,30C, 30D) are obtained by steps of:

(i) producing a formed pipe (70), the formed pipe (70) comprising a plurality of crowns (72,112) formed on the outer diameter (22) of the formed pipe (70), a plurality of roots (71,111) formed on the inner diameter (21) of the formed pipe (70), and a sidewall (113) between each root (71,111) and crown (72, 112);

(ii) cutting the formed pipe (70) on the outer diameter, thereby (iii) resulting in a plurality of bellow convolutions (30,30A,30B,30C,30D) with a formed root (31, 31A, 31B, 31C, 31D) and a first side wall (32,32A,32B, 32C,32D) and a second side wall (33,33A,33B,33C, 33D); and wherein the metal bellows (20) comprises:

a bellows capsule (20) with a first (10) end and a second (11) end; an inner diameter side (21) and an outer diameter side (22) arranged between the first end (10) and the second end (11);

characterized in that:

the bellows capsule (20) comprises a first bellows convolution (30) and second bellows convolution (40); and each bellows convolution (30,40) comprises:

a root (31,41) on the inner diameter side of the bellows capsule (21);

a first sidewall (32,42) extending from the root (31,41) toward the outer diameter side of the bellows capsule (22) with a first connection point at the distal end (321, 421);

a second sidewall (33,43) extending from the root (31,41) toward the outer diameter side of the bellows capsule (22) with a second connection point at the distal end (331,431) and wherein the second sidewall (33,43) is on the opposite side of the root as the first sidewall (32,42);

wherein:

the bellows convolutions (30,40) are formed as a single piece; and the second sidewall connection point (331) of the first bellows convolution (30) is permanently affixed to the first sidewall connection point (421) of the second bellows convolution (40).

17. The method of claim 16, wherein the formed pipe in step (i) and/or the formed bellow convolutions in step (a) is formed by hydroforming.

* * * * *